PARALLEL ADDING DEVICE WITH CARRY STORAGE

Filed Nov. 29, 1957 4 Sheets-Sheet 1

INVENTOR
HERMAN JACOB HEIJN

BY Frank R. Jifani
AGENT

July 16, 1963 H. J. HEIJN 3,098,153

PARALLEL ADDING DEVICE WITH CARRY STORAGE

Filed Nov. 29, 1957 4 Sheets-Sheet 2

INVENTOR
HERMAN J. HEIJN
BY
[signature]
AGENT

PARALLEL ADDING DEVICE WITH CARRY STORAGE

Filed Nov. 29, 1957 4 Sheets-Sheet 3

INVENTOR
HERMAN J. HEIJN
BY
Frank R. Jifani
AGENT

PARALLEL ADDING DEVICE WITH CARRY STORAGE

Filed Nov. 29, 1957 4 Sheets-Sheet 4

| | | | 524288 262144 131072 65536 32768 | 16384 8192 4096 2048 1024 | 512 256 128 64 32 | 16 8 4 2 1 |
|---|---|---|---|---|---|---|
| 1 | 350603 | = | 01010 | 10110 | 01100 | 01011 |
| 2 | 468922 | = | 01110 | 01001 | 11101 | 11010 |
| 3 | 818469 | = | 11000 | 11111 | 01001 | 00101 |
| 4 | 1056 | = | 0 | 1 | 1 | 0 |
| 5 | 786757 | = | 11000 | 00000 | 01010 | 00101 |
| 6 | 32768 | = | 1 | 0 | 0 | 0 |
| 7 | 819525 | = | 11001 | 00000 | 00010 | 00101 |
| 8 | 0 | = | 0 | 0 | 0 | 0 |

FIG.6

INVENTOR
HERMAN J. HEIJN
BY
AGENT

United States Patent Office
3,098,153
Patented July 16, 1963

3,098,153
PARALLEL ADDING DEVICE WITH CARRY STORAGE

Herman Jacob Heijn, Eindhoven, Netherlands, assignor to North American Philips Company, Inc., New York, N.Y., a corporation of Delaware Filed Nov. 29, 1957, Ser. No. 699,812
Claims priority, application Netherlands Jan. 16, 1957
2 Claims. (Cl. 235—175)

This invention relates to digital computing members comprising an arithmetic element producing the result of an arithmetic operation (addition, subtraction, multiplication, etc.) to be performed on a plurality of numbers (operands) and also comprising at least one register for registering and storing this result and any intermediate results, the arithmetic element being subdivided into a plurality of sections each corresponding to a plurality of sequential digits of the operands and of the result. It is known that the elementary arithmetical operations such as, subtraction, multiplication, etc. may be reduced directly or indirectly to addition. The arithmetic element of substantially all known high-speed digital computing machines thus is essentially an element performing additions in accordance with instructions given thereto. However, the invention is independent of the kind of the operation to be performed and of the numerical system in which the operation is carried out.

If, when considering a simple case, two numbers $x$ and $y$ are to be added, each digit of the sum $z$ depends not only upon the digits in the same digit place of the numbers $x$ and $y$, but also upon the carry resulting from the addition of the digits in the preceding digit place of the numbers $x$ and $y$, the latter in turn being dependent on the carry resulting from the addition of the digits in the preceding digit place of the numbers $x$ and $y$, etc. Hence, even though the digits of the numbers $x$ and $y$ are supplied simultaneously to the arithmetic element and are handled simultaneously, the addition process has a series character due to the rippling of the carry over all digit positions. The computing rate is thus limited by two causes, viz. (1) the time interval in which the digits registered in a register can be varied and (2) the time interval in which a carry can ripple over all digit places (since allowance has to be made for additions such as, for example, 111 . . . 11+000 . . . 01). In a computing member having many digit places, the computing rate is thus limited by the second cause. Since such additions occur only rarely, this is a great inconvenience which the invention is designed to obviate. According to the invention, a carry storage member placed between every two adjacent sections of the arithmetic element receives information about the carry resulting from the operation performed by the first of these two sections and transfers this information, during the subsequent execution cycle of the computer, to the second of these sections.

The term "logical circuit" is to be understood hereinafter to mean a circuit producing output information from one or more kinds of input information (which are usually of the yes-n-otype, but need not necessarily be so). The simplest logical circuits are inverting gates, and-gates and or-gates, which are indicated in the figures by the characters I, A and O and may be realized in known manner by means of tubes, crystal diodes, relays and, if desired, even purely mechanical members. Such gates handle information of the yes-no-type and produce information of the same type. Each of the two last-mentioned kinds of gates may be built up from the two others. By using Boolean algebraic methods or generalizations thereof, it appears that each logical circuit may be built up from gates in an infinite number of ways.

The term "indirect information" about a number of Boolean variables $x, y, z$ . . . is to be understood in this case to mean a Boolean function $f(x, y, z \ldots)$ of these variables. For each Boolean function, an infinite number of equivalent expressions may be given, each corresponding to a given circuit of inverting gates and-gates and or-gates.

In order that the invention may be more readily carried into effect, one binary adder according thereto will now be explained more fully, by way of example, with reference to the accompanying drawings, in which:

FIG. 6 is a numerical example of the adder operation.

Figure 1:
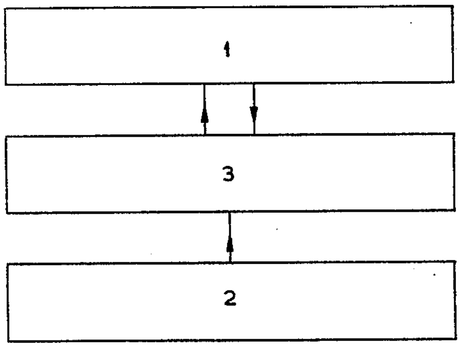
FIG. 1 shows the block diagram of a digital adder of known construction.

Referring now to FIG. 1, this figure shows in a very general sense the diagram of an adder and two associated registers. Reference numerals 1 and 2 indicate two registers and 3 indicates an adder. The latter receives information about the digits $x_1$ and $y_1$ of two numbers $x$ and $y$ to be added from the two registers 1 and 2, which is shown diagrammatically by arrows directed from the registers 1 and 2 towards the arithmetic element 3. Thus, in the adder 3, information may be produced about the digits $z_1$ of the sum $z=x+y$ of the numbers $x$ and $y$ registered in the registers 1 and 2, for example in the form of voltages in levels corresponding to these digits. From the instant at which the said information is completely registered in the arithmetic element, that is to say from the instant when all magnitudes characterizing the digits of the sum (voltages, currents, magnetic inductances, positions of a ratchet wheel, etc.) are available, the sum can be registered in the register 1 (or possibly in another member of the computing machine, for example in a memory thereof). This transfer of the number present in the adder takes place in a synchronous computer by the action of a clock pulse supplied with a constant recurrence period T by a clock pulse generator associated with the computer. This recurrence period must be greater than the greatest time interval needed by the arithmetic element 3 to produce the sum. An upper limit is thus set to the recurrence frequency of the clock pulses, which limit for machines having a comparatively large number of digit places may lie considerably below the upper limit of the frequency with which the digits in the registers 1 and 2 can be varied. This becomes clear when the structure of the three members 1, 2, 3 is considered in greater detail. The registers 1 and 2 of a binary adder 3 (FIG. 2) each comprise a plurality of bistable circuits $4_0, 4_1, 4_2$ . . . $5_0, 5_1, 5_2$ . . . . Each stable condition of the member $4_0, 4_1, 4_2$ . . ., $5_0, 5_1, 5_2$ . . . corresponds to a digit (0 and 1 in the binary system) in a given digit place. The adder 3 comprises a plurality of elementary full adders $6_0, 6_1, 6_2$ . . ., which carry out the addition proper in a manner which will be described hereinafter. Finally, the register 1 comprises a plurality of gate circuits $7_0, 7_1, 7_2$ . . ., each being connected, on the one hand, to a bistable circuit 4 and, on the other, to a full adder 6. Each gate circuit 7 is also connected to a line 8 through which the clock pulses are received. The full adders 6 are connected together and connected to the bistable circuits 4 and 5. Thus, each group of circuits 4, 5, 6, 7 corresponds to a digit place; $4_0$, $5_0$, $6_0$, $7_0$ correspond to the units, that is to say the digit place 0; $4_1$, $5_1$, $6_1$, $7_1$ corresponding to the numbers of the next higher order, that is to say the digit place 1; $4_2$, $5_2$, $6_2$, $7_2$ correspond to the numbers of the next higher order, that is to say the digit place 2; etc.

The addition of two numbers $x$ and $y$ is performed as follows. The two numbers to be added . . . $x_2x_1x_0$ and $y_2y_1y_0$ (in the binary system the numbers $$x=x_0+x_1.2+x_22^2+ \ldots \text{ and } y=y_0+y_12+y_22^2+ \ldots)$$

are registered in the registers 1 and 2 in a manner which is immaterial for the operation of the adder, that is to say, the circuit $4_0$ is brought into the condition corresponding to the digit $x_0$, the circuit $5_0$ is brought into the condition corresponding to the digit $y_0$, etc. Information about the conditions of the circuits $4_0$, $4_1$, $4_2$ . . . , $5_0$, $5_1$, $5_2$, . . . is led to the full adders $6_0$, $6_1$, $6_2$, . . . , for example in the form of voltage levels. In the full adder $6_0$, there is now produced the sum $x_0+y_0=z_0$ and a carry $c_{01}$, whilst information about the digit $z_0$ is led to the gate circuit $7_0$ and information about the carry $c_{01}$ is led to the full adder $6_1$. In the full adder $6_1$, there is produced the sum $x_1+y_1+c_{01}=c_{12}z_1$, whilst information about the digit $z_1$ is led to the gate circuit $7_1$ and information about the carry $c_{12}$ is led to the full adder $6_2$. In the full adder $6_2$, there is produced the sum $x_2+y_2+c_{12}=z_2$ and a carry $c_{23}$, whilst information about the digit $z_2$ is led to the gate circuit $7_2$ and information about the carry $c_{23}$ is led to the full adder $6_3$. This process continues in an analogous manner until information about all digits $z_0$, $z_1$, $z_2$ . . . of the sum $z=x+y$ is available. Subsequently, a clock pulse is led simultaneously through conductor 8 to all gate circuits $7_0$, $7_1$, $7_2$ . . . which then transfer the information available about the digits $z_0$, $z_1$, $z_2$ . . . to the member bistable circuits $4_0$, $4_1$, $4_2$. . . . The clock pulses are supplied in known manner at regularly recurring intervals by a clock-pulse generator forming part of the computer and which may be of any known type. If desired, the computer may comprise gate circuits causing the sum, instead of being led to the register 1, to be led directly to a different member, for example a main storage or an auxiliary storage. The presence or absence of such gate circuits has no relationship with the invention. From the foregoing, it appears that the addition, due to the rippling of carries through the adder, if any, is essentially a series-operation, that is to say, can be carried out only digit place after digit place. Registering a number in a register can take place (but need not take place) as a simultaneous operation, that is to say, all digits may be registered in the register simultaneously. The computing rate is determined by the recurrence period T of the clock pulses received at the conductor 8 and this period is limited by three causes, viz.:

(1) The minimum time interval T, in which the bistable circuits $4_i$, $5_i$ may be changed completely from one stable condition to another stable condition.

(2) The minimum time interval $T_2$, in which the bistable circuits $4_i$, $5_i$; after the occurrence of a clock pulse, can supply information about the new stable condition.

(3) The minimum time interval $T_3$, in which each of the full-adders $6_i$, after receipt of input information, can supply output information.

If the adder comprises $n$ digit places, thus $n$ full adders, then it is necessary that $$T \geqq \max(T_1,\ T_2+nT_3) \qquad (1)$$

This does not imply that each sum is available in the arithmetic element 3 only a time interval $T_2+nT_3$ after the occurrence of a clock pulse, since each full adder starts to handle the information it receives immediately upon receipt of this information, that is to say, the full adders operate simultaneously if the digits of the numbers $x$ and $y$ are applied simultaneously to them. However, the output information of the full adder $6_1$ may still vary if, a time interval $T_3$ afterwards, information about the carry $c_{01}$ of the full adder $6_0$ is received. Similarly, the output information of the full adder $6_2$ may still vary if the carry resulting from the full adder $6_1$ varies after a time interval $2T_3$, etc. In the most unfavorable case (for example in the addition . . . 11111+ . . . 00001) the sum is present in an adder comprising $n$ full adders only a time interval $nT_3$ after information about all digits $x_0$, $x_1$, $x_2$, . . . $y_0$, $y_1$, $y_2$ . . . is simultaneously available, and with recurrent additions such is the case only a time interval $T_2$ after the previous clock pulse. For high values of $n$, the computing rate is thus limited by the condition $T=T_2+nT_3$. That this is a disadvantage, appears from the fact that this time interval is necessary only rarely. Considered statistically, for arbitrary additions of binary numbers of forty figures, an average time interval $T_2+4.6T_3$ only is required for producing the sum of two numbers $x$ and $y$ in the arithmetic element, so that an enormous decrease in computing rate is necessary for additions occurring only rarely.

Figure 2:
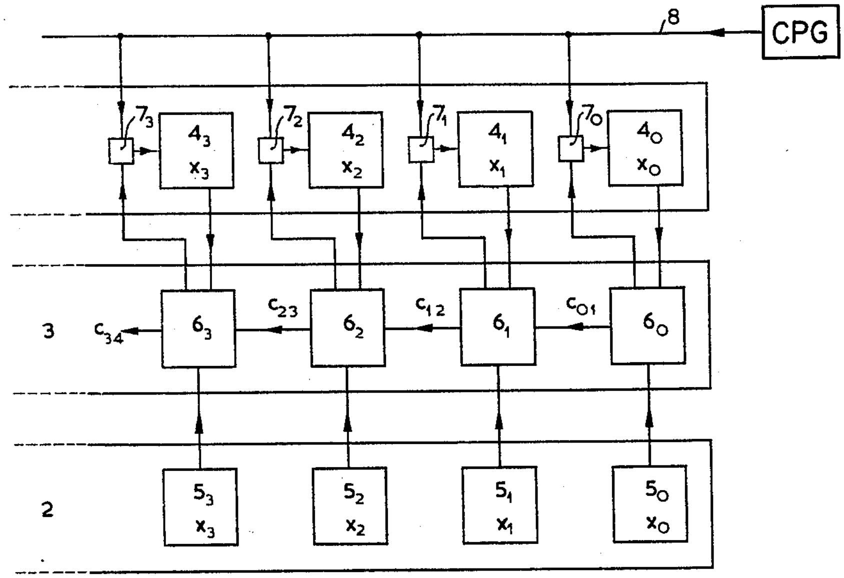
FIG. 2 shows a somewhat more detailed block diagram of the digital adder of FIG. 1.
Figure 3:
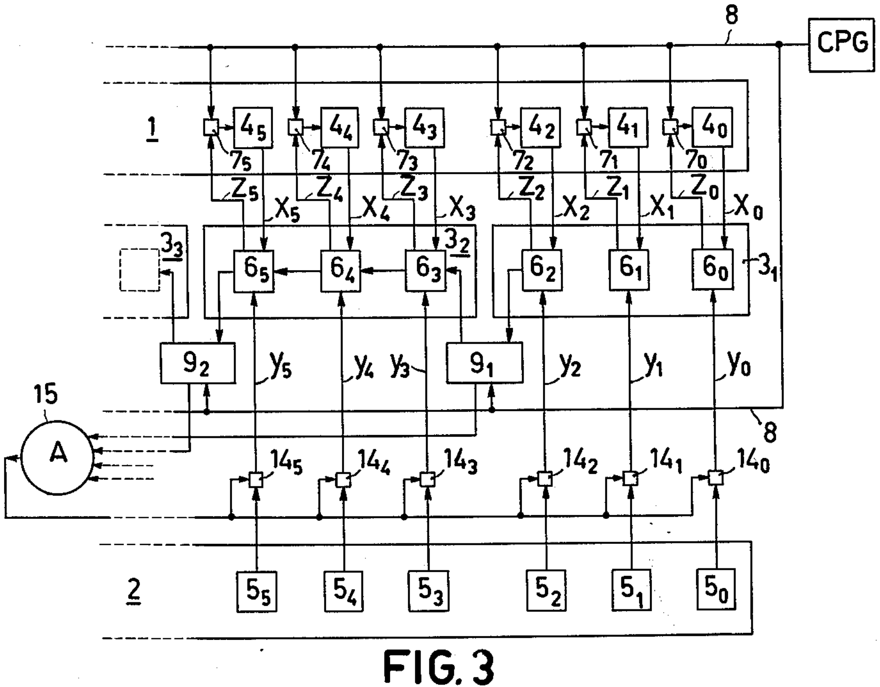
FIG. 3 shows the block diagram of an adder according to the invention.

FIG. 3 shows the block diagram of an adder according to the invention which permits of considerably increasing the computing rate. It differs from the adder of FIG. 2 in that it is subdivided into a plurality of sections $3_1$, $3_2$, $3_3$. . . . By way of orientation, these sections in FIG. 3 each correspond to three digit places 6, but the invention is not limited to this number. The manner in which the optimum number of digit places for each section may be determined, will be explained more fully hereinafter. Each section is designed in exactly the same way as shown in FIG. 2, but the information about the carry of the last full adder of a section, instead of being led to the first full adder of the subsequent section, is now led to a carry storage $9_1$, $9_2$, $9_3$ respectively . . . placed between every two successive sections. Thus, if each section corresponds to $a$ digit places, then after a time interval of at most $T_2+aT_3$ after the occurrence of a clock pulse, the sum of the associated parts of the numbers $x$ and $y$ is present in the sections of the arithmetic element and the carry storage $9_1$, $9_2$, $9_3$ . . . contain information about the carries from one section to the subsequent section. These carries are not led directly to the relevant sections, however, but are kept stored in the carry storages $9_1$, $9_2$, $9_3$. . . . Upon the subsequent clock pulse delivered by the clock pulse generator, the information about the digits $z_0$, $z_1$, $z_2$ . . . present in the sections of the adder is transferred via the gate circuits $7_0$, $7_1$, $7_2$, . . . , to the bistable circuits $4_0$, $4_1$, $4_2$, . . . of the register 1, while at the same time the information present at the input terminals of the carry storages $9_1$, $9_2$, $9_3$, . . . about the carries formed at the ends of the sections is transferred to the output terminals of said carry storages; the carries are stored in the carry storages and remain available during the whole next cycle, i.e., till the occurrence of the next following clock pulse. If necessary this transfer of information is somewhat delayed, to prevent these carries, upon the occurrence of a clock pulse, from being transferred also to the register 1 due to closed circuits that may be formed across the sections of the adder and the corresponding sections of the register 1, which could result in instability. Evidently, it is now necessary to fulfil the condition:

$$T \geqq \max(T_1,\ T_2+aT_3,\ T_4+aT_3) \qquad (2)$$

wherein $T_4$ is the time interval in which, after the occurrence of a clock pulse, information can propagate from the input terminal to the output terminal of each of the carry storages $9_1$, $9_2$, $9_3$. . . . If the bistable circuits $4_0$, $4_1$ . . . , $5_0$, $5_1$ . . . , $9_1$, $9_2$ . . . comprise, for example, trigger circuits having two stable conditions of the Eccles-Jordan type (suitable for the binary system) and if the full adders $6_0$, $6_1$, . . . have at the most three stages, it is possible, with the necessary tolerance, to assume that $T_1=700$ nsec., $T_2=T_4=460$ nsec., $T_3=60$ nsec., where 1 nsec.=1 nanosec.$=10^{-9}$ sec. Then we have:

$$T \geqq \max(700, 460+60a) \quad (3)$$

so that it may be assumed that $T=1000$ nsec. (corresponding to $\sqrt{=}1$ mc./s.) and $a=9$. When performing an addition, in general a carry will appear at the ends of some of the sections, i.e. at the input terminals of some of the carry storage elements $9_1$, $9_2$, $9_3$, . . . at the end of the first of the cycles of the clock pulse generator in which this addition is handled. However, there is a great chance that these carries will be handled during the next cycle of the clock pulse generator since, as said above, the mean length over which runs a carry in a forty digit position adder is less than five digit positions. If, however, a carry appears at the ends of some sections at the end of this second cycle, there is a still greater probability that these carries are all completely handled during the next following cycle. The bulk of all additions will take place, for this reason in one, two, three or four cycles of the clock pulse generator and only in the most unfavorable cases will the carry have to run over all carry storage elements. The additions in which this takes place are relatively rare, however. Moreover, when several additions have to be performed successively, as for instance, when carrying out a multiplication, it is not necessary to handle the carry before the next addition can begin, since carries resulting from an addition may be handled during the first cycle of the next following addition. As a result, the multiplication of two $n$ digit numbers necessitates $n$ cycles plus a generally few number of additional cycles for handling the carries resulting from the last addition. The number of additional cycles is at most equal to the number of carry storage elements minus one but in most cases is much less.

FIG. 6 illustrates the working of an adder according to the invention by a numerical example. It is assumed, in this figure, that the numbers 350603 and 468922 are to be added. In the binary number system:

350603=1010101100110001011
468922=1110010011110111010

Further it is assumed that each section corresponds to five digit positions. The third and fourth lines of FIG. 6 then give the result of the addition performed during the first cycle, the fifth and sixth lines the result of the addition performed during the second cycle and the seventh and eighth lines the result of the addition performed during the third cycle. It is seen, from this figure, that by the addition performed during the first cycle carries are formed at the ends of the first and second sections, which carries will be handled in the second and third sections. By the addition performed during the second cycle only a carry is formed at the end of the third section, which carry will be handled during the third cycle. By the addition performed during the third cycle no carries are formed at the ends of the sections.

Figure 4:
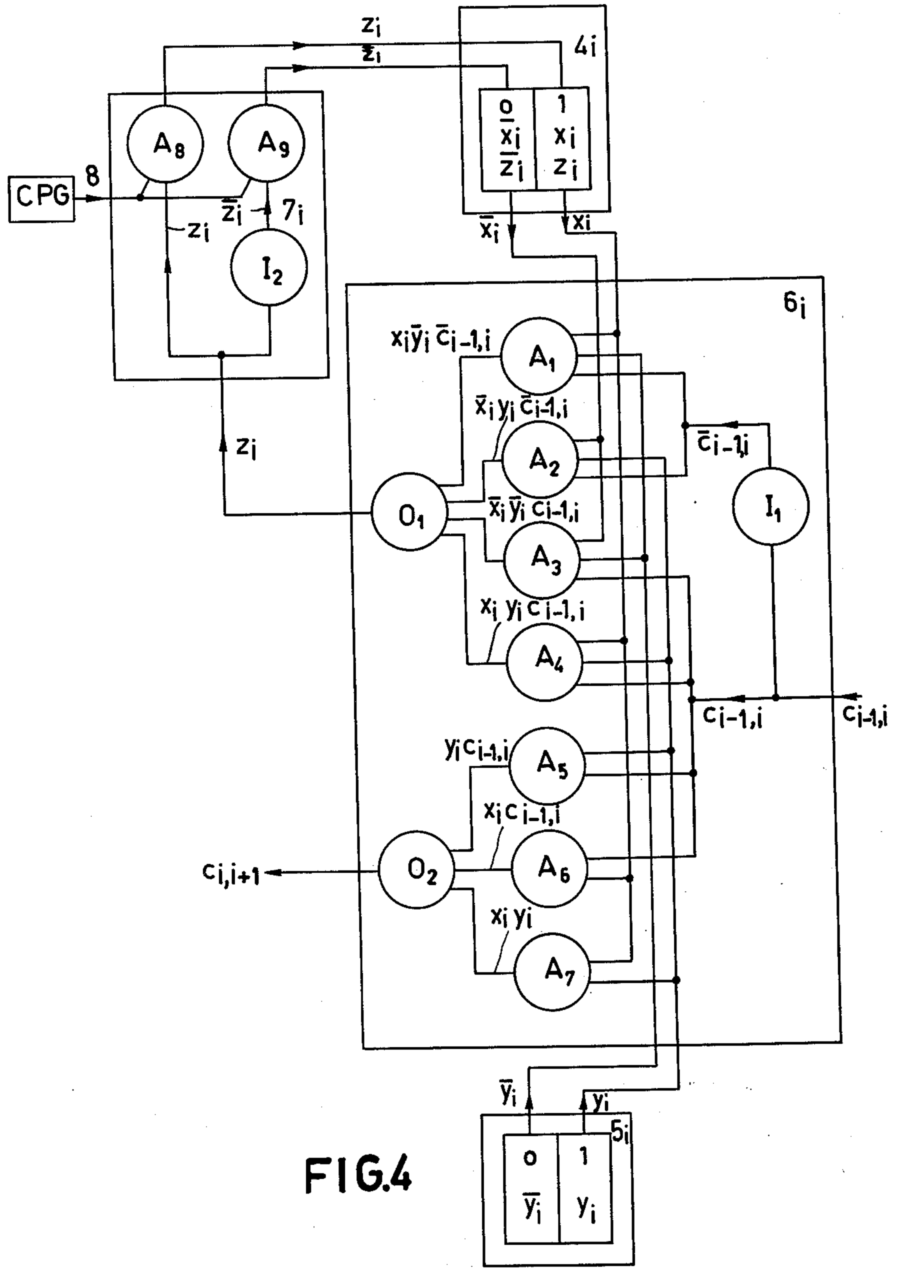
FIG. 4 shows the diagram of a possible embodiment of a full adder and the associated circuits of the two registers.

FIG. 4 shows a possible embodiment of the circuits $4_i$, $5_i$, $6_i$, $7_i$ associated with the $i$'th digit position.

The circuits $4_i$ and $5_i$ are bistable trigger circuits, which supply a high or a low voltage as output information and which may be adjusted by means of a (positive or negative) pulse. Examples of such trigger circuits are bistable Eccles-Jordan circuits.

According to the Boolean-algebraic function, the sum digit $z_i$ and the carry $c_{i,\,i+1}$ may be expressed as follows:

$$z_i = x_i\bar{y}_i\bar{c}_{i-1,i} + \bar{x}_i y_i \bar{c}_{i-1,i} + \bar{x}_i\bar{y}_i c_{i-1,i} + x_i y_i c_{i-1,i},$$
$$c_{i,i+1} = y_i c_{i-1,i} + c_{i-1,i} x_i + x_i y_i \quad (4)$$

wherein the symbol += designates or, the symbol .= designates and, and a bar over a character means negation. The expression for $c_{i,\,i+1}$ is for the particular circuit indicated in FIG. 4. The term $x_i\bar{y}_i\bar{c}_{i-1,i}$ means that $x_i=1, y_i=0, c_{i-1,i}=0$. The whole expression for $z_i$ means that at least one of the four conditions represented by the four terms occurs. A circuit $6_i$, which realizes these equations from the view point of switching technique, may be built up according to known rules from inverting gates I, and-gates A and or-gates O (see for instance: R. Serrell—Elements of Boolean Algebra for the Study of Information-handling Systems, P.I.R.E., vol. 41, 1953, pp. 1366–1380). FIG. 4 shows a circuit which may be said to be a "word-by-word translation" of the Formulas (4); this is, of course, an adder circuit. In this connection it is to be noted that no inverting gates are required for producing voltages representing the information $\bar{x}_i$ and $\bar{y}_i$, since these voltages are already made available by the bistable circuits $4_i$ and $5_i$. A voltage representing the quantity $\bar{c}_{i-1,i}$ is produced by the non-gate I, from the voltage representing the quantity $c_{i-1,i}$. Voltages representing the terms $x_i\bar{y}_i\bar{c}_{i-1,i}$, $\bar{x}_i y_i\bar{c}_{i-1,i}$, $\overline{xy}_i\bar{x}_i c_{i-1,i}$, $x_i y_i c_{i-1,i}$ are produced by the and-gates $A_1$, $A_2$, $A_3$, $A_4$ respectively, and the or-gate $O_1$ forms, from these voltages, a voltage representing the quantity $z_i$. Similarly, voltages representing the three terms $y_i c_{i-1,i}$, $c_{i-1,i}x_i$ and $x_i y_i$ are produced by the and-gates $A_5$, $A_6$, $A_7$ respectively and the or-gate $O_2$ forms, from these voltages, a voltage representing the quantity $c_{i,i+1}$. A non-gate $I_2$ forms, from the voltage representing the quantity $z_i$, a voltage representing the quantity $\bar{z}_i$. Finally the and-gates $A_8$ and $A_9$ make available at the input terminals of the bistable circuit $4_i$ the voltages representing the quantities $z_i$ and $\bar{z}_i$ at the instants of the clock pulses. It will be remembered, however, that many other full-adder constructions are possible and that the invention is independent of the special embodiment of the full-adders $6_i$ used.

Figure 5:
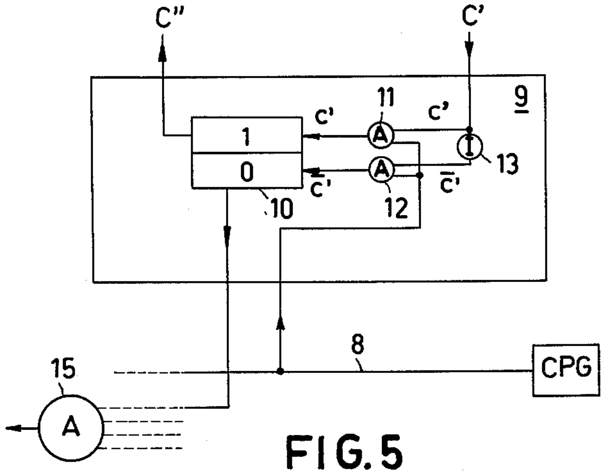
FIG. 5 shows the diagram of a possible embodiment of the carry storage circuits placed between the pairs of adjacent sections of the arithmetic element of the adder shown in FIG. 3.

FIG. 5 shows a possible embodiment of the carry storage elements $9_1$, $9_2$. . . . The carry storage 9 shown in this figure comprises a bistable circuit 10 of the Eccles-Jordan-type, two and-gates 11 and 12, and an inverting gate 13. The carry storage element receives at its input terminal a voltage representing the carry $c'$ appearing at the end of the section preceding the carry storage element concerned and delivers at its output terminal a voltage representing the carry $c''$ which must be fed to the beginning of the next following section. The inverting gate 13 forms a voltage representing the quantity $\bar{c}'$. The and-gates 11 and 12 make available at the input terminals of the bistable circuit 10 the quantities $c'$ and $\bar{c}'$ at the instants of the clock pulses. The output terminal of the carry storage element is connected to the output terminal of the bistable circuit 10 delivering a high voltage representing the quantity $c''$. This voltage is available about 460 nsec. after the occurrence of a clock pulse.

The computer must, of course, be controlled so that during the execution cycles of the machine which serve only to handle the carries stored in the carry storage elements, information of the register 2 which differs from O is not led to the full adders $6_0$, $6_1$, $6_2$. In FIG. 3 this is effected by interposing gate circuits $14_0$, $14_1$, $14_2$, . . . in the leads from the bistable elements $5_i$ of the register 2 and the elementary full-adders $6_i$, which gates are open either if none of the carry storage elements $9_1$, $9_2$, $9_3$, . . . contains a carry 1 or if the contents of the register 2 have just been changed in order to effectuate a new addition with a different augend, or if new additions with the same augend have to be performed in behalf of a multiplication. A voltage opening the gates $14_0$, $14_1$, $14_2$, . . . in the first case may be obtained by means of a multiple and-gate 15, the input terminals of which are connected to the output terminals of the bistable circuits 10 of the carry storage elements $9_1$, $9_2$, $9_3$, . . . delivering a high voltage when the carry $c''$ stored in said bistable circuit concerned is an O. This is shown in FIG. 5. A voltage opening the gates $14_0$, $14_1$, $14_2$, . . . in the other two cases must be delivered by the general control circuit of the computer. The way in which this can be done is not shown in detail in the accompanying drawing since this is not directly connected to the invention. It is further to be understood, of course, that any quantitative data given above is set forth only to enable ready practice of the invention and is not intended in any way to limit its scope, which scope is set forth in the following claims.

What is claimed is:

1. A parallel operating arithmetic element for a digital computer comprising an adder producing the result and intermediate results of an addition operation to be performed on a plurality of operands, at least one register for registering and storing said results in the form of pulses, each pulse corresponding to a digit, said adder being subdivided into a plurality of sections, each section corresponding to a predetermined number of sequential digits of said operands and said results, all adjacent sections being separated by a storage member which stores information in the form of pulses representative of the carry resulting from the addition operation performed in one of said sections, the carry formed within each section rippling sequentially through said section, a plurality of gate circuits for controlling the transfer of said results from said adder to said registers, and means for applying clock pulses simultaneously to said gate circuits and said storage members, said clock pulses acting to transfer results in the form of pulses to said registers and to transfer pulses representative of carries from a preceding section of said arithmetic element to a following section.

2. A computer as claimed in claim 1, further comprising a second control member connected to all of said storage members, said second control member being responsive to the pulses stored in said storage members, thereby providing an indication of the presence or absence of carry signals in said storage members.

References Cited in the file of this patent

UNITED STATES PATENTS

| | | |
|---|---|---|
| 2,585,630 | Crosman | Feb. 12, 1952 |
| 2,840,305 | Williams | June 24, 1958 |
| 2,879,001 | Weinberger et al. | Mar. 24, 1959 |
| 2,907,526 | Havens | Oct. 6, 1959 |

OTHER REFERENCES

"Arithmetic Operations in Digital Computers" (Richards), published by D. Van Nostrand Co. (New York), 1955. (Pages 232–233 relied on.)